UNITED STATES PATENT OFFICE.

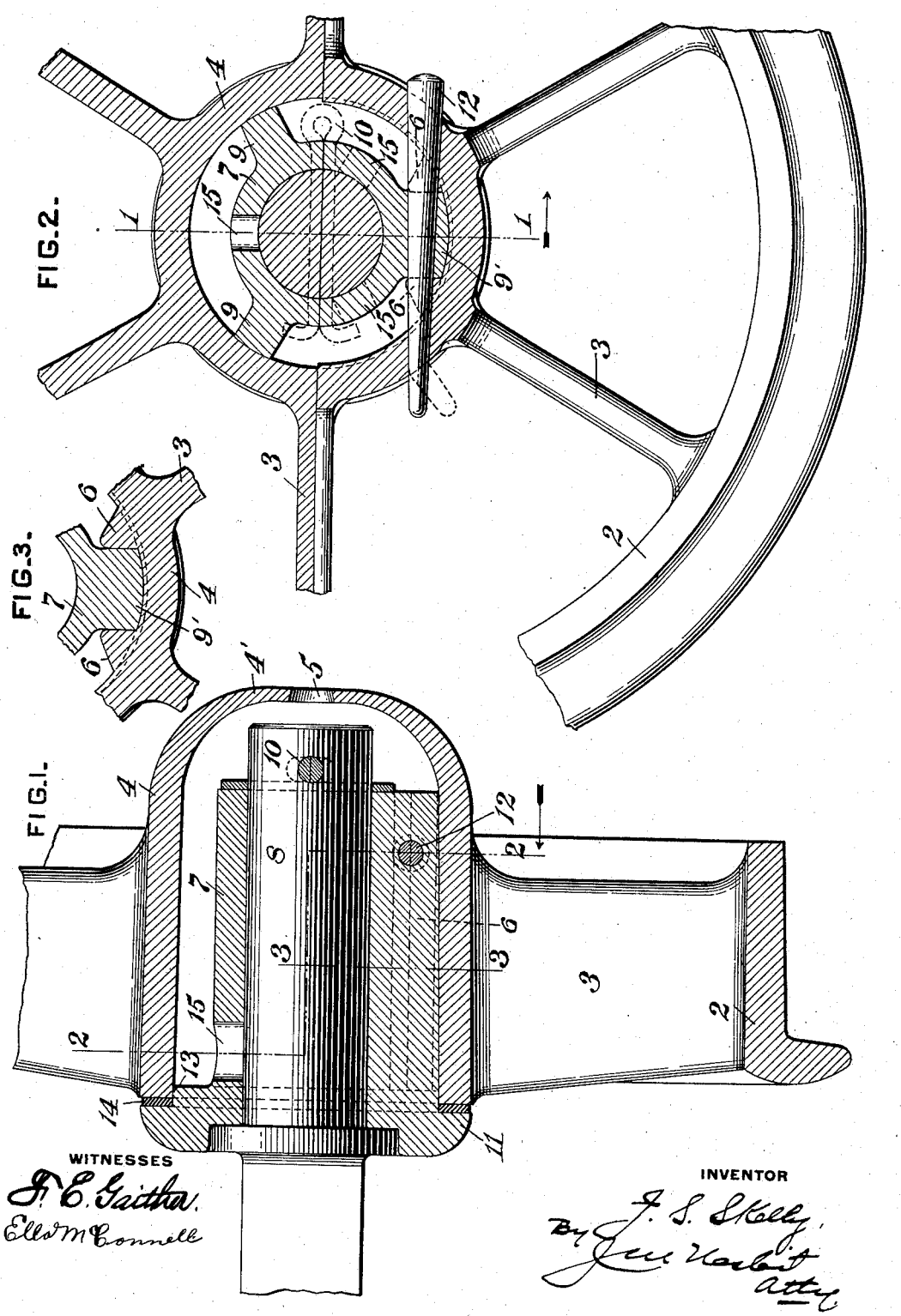

JOHN S. SKELLY, OF MONONGAHELA, PENNSYLVANIA.

MINE-CAR WHEEL.

1,015,351.      Specification of Letters Patent.      Patented Jan. 23, 1912.

Application filed June 21, 1910. Serial No. 568,235.

*To all whom it may concern:*

Be it known that I, JOHN S. SKELLY, a resident of Monongahela, in the county of Washington and State of Pennsylvania, have invented certain new and useful Improvements in Mine-Car Wheels, of which the following is a specification.

This invention relates to car wheels which rotate on their journals, and has particular reference to wheels for mine cars and other services where the wheel bearings are exposed to much dirt and dust which causes them to wear rapidly, the wheels becoming unserviceable in many instances through wearing out the hub or bearing portion although the rim or tread shows no appreciable wear.

The present invention provides a wheel having a separable or removable box or lining which is the part subject to the greatest wear and which may be replaced when worn out, the hub proper and the rim or tread continuing in use as long as it is serviceable.

In adapting the invention to self-oiling wheels such as are used on mine cars, a further object is to so construct the box and hub as to provide an oil reservoir, with means for feeding the oil to the journal or axle. In this development of the wheel, the hub is preferably of the cap type, i. e., closed at its outer end save for a central oil admitting aperture, the box being entered therein through the inner or open end of the hub and arranged with a portion adapted to close such open end when the box is fully inserted. The box and hub or wheel proper may be variously united. In the preferred adaptation for mine cars, the box is first confined on the axle, and then the wheel proper is slipped thereover and it and the box are keyed together, holding the wheel in position on the box, with said parts rigidly united and turning in unison.

In the accompanying drawings, Figure 1 is a view of a portion of the improved wheel designed especially for mine car service, the wheel hub and its separate box being shown in section. Fig. 2 is a cross-section on the offset line 2—2 of Fig. 1, and Fig. 3 is a cross-section of a portion of the wheel hub and box, taken on line 3—3 of Fig. 1.

Referring to the drawings, 2 designates the wheel rim or tread, 3 the spokes, and 4 the hollow hub, said parts being preferably cast integral, as is customary with this type of wheel. In the present embodiment, the hub is of cap form, i. e., its outer end 4' is capped or closed, save for a central oil admitting aperture 5. The bore of the hub is relatively large, and is smooth save for the two parallel ribs 6 spaced apart as shown.

7 is the sleeve-like box which has a turning fit on the axle journal 8. In cross-section sleeve 7 is materially smaller than the bore of the hub, but the parts are held in concentric relation by the interposed ribs 9, and in the preferred embodiment these ribs are integral with sleeve or box 7 and exactly fit within the hub with the latter and the box in concentric relation, as shown. Three ribs are here shown, and one of them, 9', is preferably slightly thicker or wider than the other two and has a close fit between the hub ribs 6, and as the hub ribs correspond in length to rib 9' it will be seen that the parts are held rigidly together throughout practically the whole length of the bearing.

In the present adaptation, the boxing is first applied to the axle upon which it is secured by a cotter 10, and then the wheel hub is slipped thereon, the enlarged or head-like inner portion 11 of the box closing the inner or open end of the hub, and when the parts are thus assembled a tapered key 12 is entered in a keyway formed through the wheel hub, its two flanges 6 and the box rib 9', with the smaller end of the key bent to one side, as in Fig. 2, to hold it in place. The hub bore and the outer faces of the box ribs are formed with just sufficient taper to insure a tight fit when the parts are assembled, the extremity of the hub fitting over the annular shoulder 13 on the inner face of the headed portion 11, and preferably with a felt or other washer 14 between the extremity of the hub and the face of head 11.

It will be noted that the hub is longer than the box over which it fits, with the excess length at the front or outer end of the hub and in effect constituting cap portion 4'. The space within this cap portion is slightly deeper or wider than the projecting portion of the axle, so that the oil may be freely entered at the central inlet 5. The space within the cap portion, and also the space between box 7 and the hub bore and divided by ribs 9, 9', constitutes an oil reservoir, with ports 15 through the box, preferably adjacent its inner end, for passing oil to axle 8. So long as the amount of oil injected does not rise above the plane of the bottom of inlet 5, there can be no considerable waste, and as the wheel rotates it will be seen that the ribs 9, 9', carry the oil up and around the axle, causing it to work through ports 15, and with said ports at the inner end of the box the oil will tend to work along the axle toward the box securing means, as will be understood. The direct securing means (cotter 10) is wholly inclosed by the hub and there can be no accidental or other removal thereof as sometimes occurs when the securing means is exposed and accessible.

With the separable hub and boxing as herein proposed, the boxing may be made of such grade of metal as is best suited for the purpose, and the same is true of the hub, spokes and rim. The cost of the wheel is thereby minimized, and furthermore it is entirely practicable to cast the wheel with straight spokes, as the absence of a large mass of metal in the hub—usual in wheels as now constructed—allows uniform shrinkage and produces a wheel without casting stresses due to shrinking. Hence, the spokes may be straight without danger of breaking, and need not be curved, as heretofore.

As before noted, the hubs of mine car wheels wear rapidly and frequently become unserviceable before the rims show any wear at all. With the present invention the wheel proper may be used as long as it is serviceable, it being necessary to renew only the worn part.

I claim:

1. The combination of a wheel hub having two longitudinal ribs projecting inwardly from the surface of its bore, an axle box, longitudinal ribs on the exterior of the box which bear against the wall of the hub bore and provide lubricant space, one of the box ribs fitting between the two hub ribs, and a locking key extended transversely through the hub and box and through the interfitting ribs.

2. The combination of a wheel hub, an axle box, longitudinal ribs on one of said parts which space apart the hub and axle to provide lubricant space, longitudinal ribs on the other of said parts adapted to receive therebetween one of the first mentioned ribs, said coöperating ribs and the hub formed with alining transverse apertures, and a tapered key extended through the apertures with its extremity bent at the exterior of the hub to confine it in place.

3. The combination of a car wheel having a hollow internally tapered hub, an axle box smaller than the hub interior and having external longitudinal projections tapered on their outer faces to fit within the tapered hub, separated ribs on the inner surface of the hub between which one of the box projections is entered when the parts are assembled, the hub being formed with a transverse keyway which extends through said ribs and the box projection between the ribs having a similar keyway which registers therewith when the parts are assembled, and a tapered key entered in the keyways for forcing and holding the parts in tightly fitting relation.

4. The combination of a car wheel having a hollow hub open at its inner end and closed at its outer end save for an oil inlet, the interior of the hub tapered inwardly from its open end, an axle-box tapered on its exterior to removably fit within the tapered hub, the box having a headed portion which closes the open end of the hub, packing interposed between said head and the hub extremity, the hub and the box formed with a transverse keyway, and a tapered key entered in the keyway for wedging and holding the interfitting parts in close relation with said packing compressed between the parts confining the same.

In testimony whereof I affix my signature in presence of two witnesses.

JOHN S. SKELLY.

Witnesses:
J. M. NESBIT,
F. E. GAITHER.